US 10,549,841 B2

United States Patent
Nussenblatt et al.

(10) Patent No.: US 10,549,841 B2
(45) Date of Patent: Feb. 4, 2020

(54) STRUCTURALLY EFFICIENT PIN WRAP

(71) Applicant: Sikorsky Aircraft Corporation, Stratford, CT (US)

(72) Inventors: Eric Lucien Nussenblatt, Stamford, CT (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 409 days.

(21) Appl. No.: 15/311,680

(22) PCT Filed: May 20, 2015

(86) PCT No.: PCT/US2015/031723
§ 371 (c)(1),
(2) Date: Nov. 16, 2016

(87) PCT Pub. No.: WO2015/183658
PCT Pub. Date: Dec. 3, 2015

(65) Prior Publication Data
US 2017/0096213 A1    Apr. 6, 2017

Related U.S. Application Data

(60) Provisional application No. 62/005,021, filed on May 30, 2014.

(51) Int. Cl.
*B64C 11/04* (2006.01)
*B64C 27/48* (2006.01)

(52) U.S. Cl.
CPC .............. *B64C 11/04* (2013.01); *B64C 27/48* (2013.01)

(58) Field of Classification Search
CPC ......... B64C 11/04; B64C 11/06; B64C 11/08; B64C 11/12; B64C 11/16; B64C 11/20;
(Continued)

(56) References Cited

U.S. PATENT DOCUMENTS 3,279,278 A    10/1966    Eldred
3,475,988 A  * 11/1969    Ditlinger ............... B64C 27/327
                                                                174/178
(Continued)

FOREIGN PATENT DOCUMENTS

EP    2570346 A1    3/2013
EP    2634091 A1    9/2013

OTHER PUBLICATIONS

Miller, Williard; The Formula for Curvature, 2007 (Year: 2007).*
(Continued)

*Primary Examiner* — David E Sosnowski
*Assistant Examiner* — Maranatha Boardman
(74) *Attorney, Agent, or Firm* — Cantor Colburn LLP

(57) ABSTRACT

A pin wrap having a unitary construction that includes a first elongated arm extending from an inboard end to an outboard end; a second elongated arm extending from the inboard end to the outboard end; and a curved end having an internal surface and a directly opposing external surface. The curved end integrally connects the first elongated arm to the second elongated arm at the outboard end. Also, the curved end is arcuate having a plurality of radii of curvatures. A blade and a helicopter with a blade can include the pin wrap.

14 Claims, 4 Drawing Sheets

(58) Field of Classification Search
CPC ....... B64C 11/26; B64C 27/327; B64C 27/46; B64C 27/473; B64C 27/48
See application file for complete search history.

(56) References Cited

U.S. PATENT DOCUMENTS

| | | | | |
|---|---|---|---|---|
| 3,533,714 A * | 10/1970 | Pfleiderer | ............. | B64C 27/001 416/144 |
| 3,578,877 A | 5/1971 | Karlheinz | | |
| 3,669,566 A | 6/1972 | Bourquardez et al. | | |
| 3,754,840 A | 8/1973 | Zincone | | |
| 3,923,422 A * | 12/1975 | Ianniello | ................. | B64C 27/48 416/226 |
| 4,096,012 A * | 6/1978 | Belko | ................... | B64C 27/473 156/214 |
| 4,183,261 A * | 1/1980 | Eiselbrecher | ......... | B29C 53/564 74/579 R |
| 4,281,966 A * | 8/1981 | Duret | ................. | B29D 99/0025 416/134 A |
| 4,403,918 A * | 9/1983 | Schramm | ................ | B64C 27/33 416/138 |
| 4,616,977 A * | 10/1986 | Schramm | ................ | B64C 27/46 416/134 A |
| 4,626,173 A * | 12/1986 | Mouille | ............. | B29D 99/0025 416/134 A |
| 4,696,623 A * | 9/1987 | Bost | ................... | B29D 99/0025 416/226 |
| 4,892,462 A * | 1/1990 | Barbier | .............. | B29D 99/0025 416/134 A |
| 4,961,687 A * | 10/1990 | Bost | ....................... | B29C 37/005 416/230 |
| 4,966,527 A * | 10/1990 | Merz | .................... | B29C 70/202 416/230 |
| 5,110,260 A | 5/1992 | Byrnes et al. | | |
| 5,755,558 A * | 5/1998 | Reinfelder | ............ | B29C 70/446 416/230 |
| 9,169,011 B2 * | 10/2015 | Hunter | .................... | B64C 27/32 |
| 9,365,285 B2 * | 6/2016 | Tutaj | ....................... | B64C 11/26 |
| 9,366,155 B2 * | 6/2016 | Tutaj | ....................... | B64C 11/04 |
| 2013/0164142 A1* | 6/2013 | Tutaj | ....................... | B64C 11/24 416/226 |
| 2017/0217564 A1* | 8/2017 | Nussenblatt | ............ | B64C 27/33 |

OTHER PUBLICATIONS

ISR/WO, Issued Aug. 18, 2015, PCT application No. PCT/US15/31723, 8 pages.
European Patent Office, Extended European Search Report for Application No./Patent No. 15798805.6-1754/3148876, dated Dec. 13, 2017 (8 pp.).

* cited by examiner

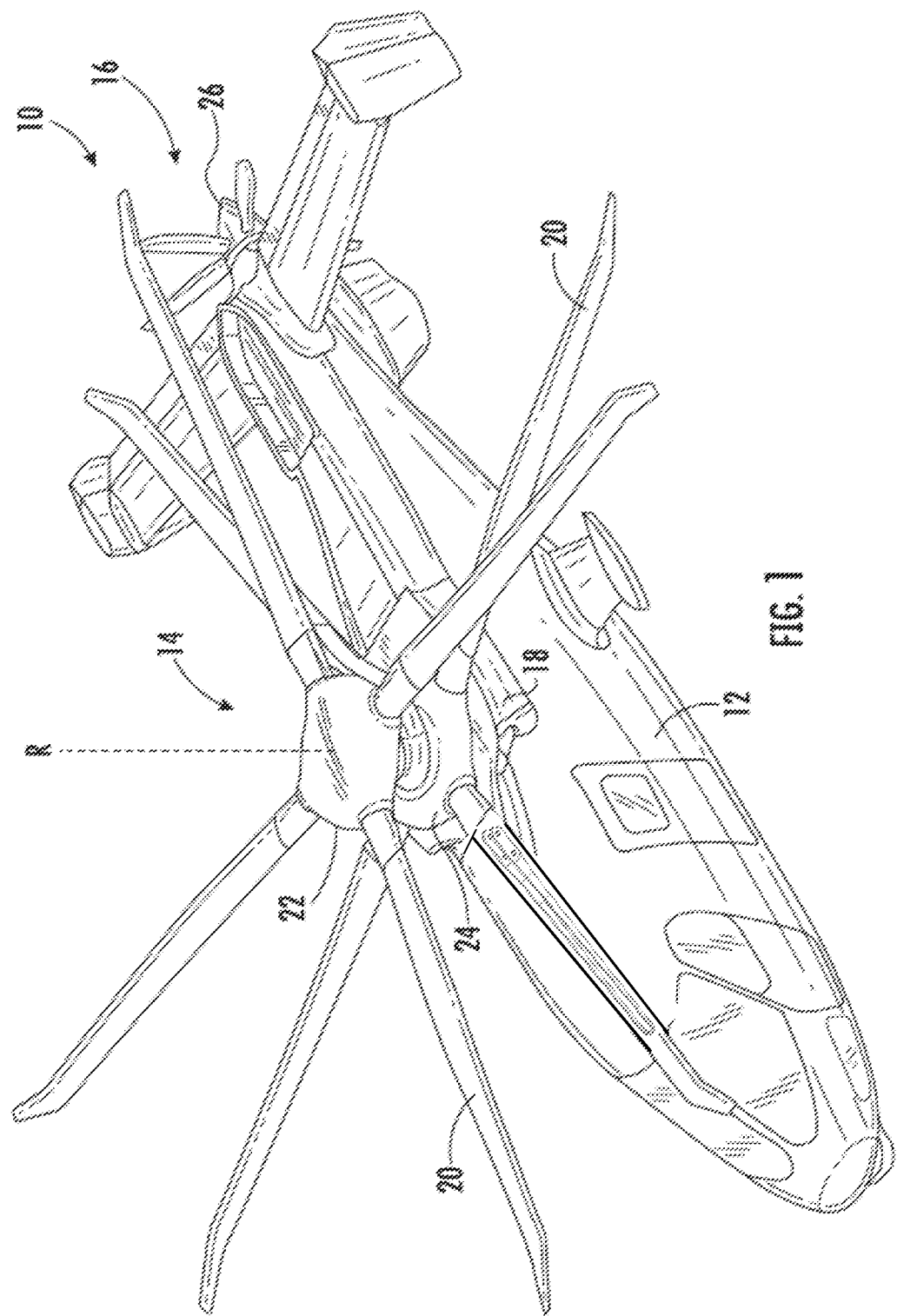

STRUCTURALLY EFFICIENT PIN WRAP

This application is a National Phase Application of Patent Application PCT/US15/31723 filed on May 20, 2015, which claims the benefit of and priority to U.S. Provisional patent application Ser. No. 62/005,021 filed on May 30, 2014, the contents of which are incorporated herein by reference in their entirety.

BACKGROUND

The subject matter disclosed herein relates to propellers and to a structurally efficient pin wrap configuration for a propeller blade.

DESCRIPTION OF RELATED ART

Traditional composite pin wraps used in rotor blades are spar-type members made from, typically, uniform orthotropic composite materials such as, e.g., graphite or fiberglass. These traditional pin wraps consist of a composite beam of a given height. The pin wrap includes a curved loop at an outboard end having a single radius of curvature that wraps around a circular clamp or fitting at the outboard end. However, traditional composite pin wraps can have structural deficiencies in their design. One deficiency comes from contact with the circular clamp or fitting. The circular clamp or fitting places a large stress concentration at a tangency where the flat portion of the wrap meets a circle of the composite beam. This non-uniform stress at the tangency point results in a pin wrap that is oversized at the wrap area of the composite pin wrap. Another deficiency comes from use of orthotropic materials in the composite pin wrap, which causes a non-uniform pressure distribution across a height of the composite pin wrap that is in contact with the circular clamp or fitting at the outboard end. The non-uniform pressure distribution causes localized stress concentrations at the top and bottom edges of the composite pin wrap. A need therefore exists for a structurally efficient composite pin wrap that addresses the deficiencies of traditional pin wraps.

BRIEF SUMMARY OF THE INVENTION

According to one embodiment of the invention, a pin wrap having a unitary construction includes a first elongated arm extending from an inboard end to an outboard end; a second elongated arm extending from the inboard end to the outboard end; and a curved end having an internal surface and a directly opposing external surface. The curved end integrally connects the first elongated arm to the second elongated arm at the outboard end. Also, the curved end is arcuate having a plurality of radii of curvatures.

In addition to one or more of the features described above, or as an alternative, further embodiments could include a plurality of radii of curvatures that include a first radius of curvature for a first section of the interior surface and a second radius of curvature for a second section of the interior surface.

In addition to one or more of the features described above, or as an alternative, further embodiments could include a first radius of curvature that is dissimilar from the second radius of curvature.

In addition to one or more of the features described above, or as an alternative, further embodiments could include an internal surface that has a convex shape along a height of the curved end, the height being perpendicular relative to a plane defined by the plurality of radii.

In addition to one or more of the features described above, or as an alternative, further embodiments could include a convex shape that is configured to redistribute stress uniformly along the height of the curved end.

In addition to one or more of the features described above, or as an alternative, further embodiments could include an external surface that has a concave shape along a height of the curved end, the height being perpendicular relative to a plane defined by the plurality of radii.

In addition to one or more of the features described above, or as an alternative, further embodiments could include a curved end that is configured to receive a connecting element along the internal surface.

In addition to one or more of the features described above, or as an alternative, further embodiments could include a plurality of radii of the curved end configured to create a uniform pressure distribution along the internal surface.

In addition to one or more of the features described above, or as an alternative, further embodiments could include first and second elongated arms that are tapered from the inboard end to the outboard end.

In addition to one or more of the features described above, or as an alternative, further embodiments could include a pin wrap that is made from an orthotropic composite material.

In addition to one or more of the features described above, or as an alternative, further embodiments could include an inboard end with a plurality of bolt holes for attachment to a structure.

In addition to one or more of the features described above, or as an alternative, further embodiments could include a rotor blade having a body that contains the pin wrap.

In addition to one or more of the features described above, or as an alternative, further embodiments could include a rotor blade that is configured to be coupled to a rotor hub.

In addition to one or more of the features described above, or as an alternative, further embodiments could include a helicopter that contains the pin wrap.

In addition to one or more of the features described above, or as an alternative, further embodiments could include a plurality of rotor blades coupled to a rotor hub; where the pin wrap is contained within each of the rotor blades and being configured to connect each of the rotor blades to the rotor hub.

The technical function achieved by one or more embodiments and/or alternatives described above includes distributing stress along a pin wrap when tension is applied to the pin wrap. With the plurality of multiple radii, stress concentration along an edge of tangency is minimized as stress in the pin wrap is distributed along the entire perimeter of curved end which creates a uniform pressure distribution at curved end and a structurally efficient pin wrap. Also, in an embodiment of a pin wrap with an orthotropic composite material, by pre-curving the pin wrap with convex and concave surfaces, loads or stress can be redistributed along entire height of curved end when tension is applied.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

FIG. 1 is a general perspective view of a rotary wing aircraft according to an embodiment of the invention;

DETAILED DESCRIPTION OF THE INVENTION

Figure 2A:
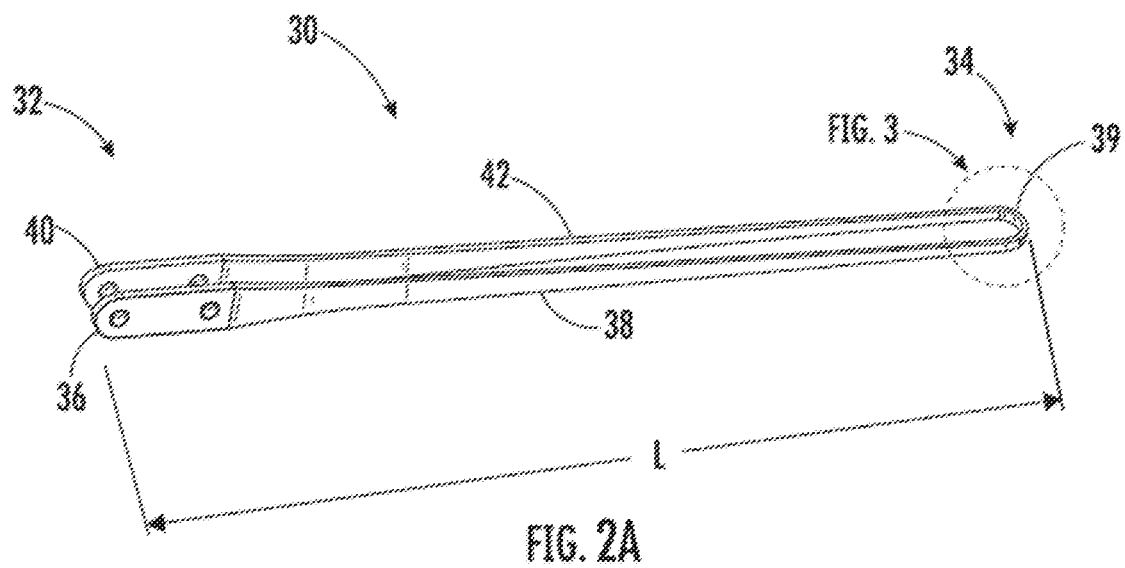
FIG. 2A is a perspective view of a pin wrap according to an embodiment of the invention.

Referring to the drawings, FIG. 1 illustrates an example of a vertical takeoff and landing (VTOL) high speed compound or coaxial contra-rotating rotary wing aircraft 10. In an embodiment, rotary wing aircraft 10 can include an orthotropic pin wrap 30 in a plurality of rotor blades 20 or propeller blades 26 for connecting to a rotor hub of rotor system 14. Aircraft 10 has an airframe 12 which supports a dual, contra-rotating main rotor system 14 and a translational thrust system 16. Main rotor system 14 rotates about a rotor axis of rotation R and is driven for rotation by one or more engines 18. Main rotor system 14 includes a plurality of rotor blades 20 mounted to a contra-rotating rotor system 22, 24 for lift, anti-torque and thrust. Also, a translational thrust system 16 can provide supplemental or auxiliary thrust for aircraft 10 through a plurality of propeller blades 26. Although a particular configuration of rotary wing aircraft 10 is illustrated and described in the disclosed non-limiting embodiments, other configurations, and/or machines with rotor systems are within the scope of the present invention. While the invention is described with reference to rotary-wing aircraft, where weight and strength advantages of composites over other technologies is exemplary, the concepts and ideas expressed herein can also benefit and be equally applicable to other structures such as, for example, other portions of an aircraft (such as a yoke), in wind turbines, and other systems with rotary elements. As such, embodiments of the disclosed invention are not restricted to application in aircraft, but are applicable wherever an efficient pin wrap is desired.

Figure 2B:
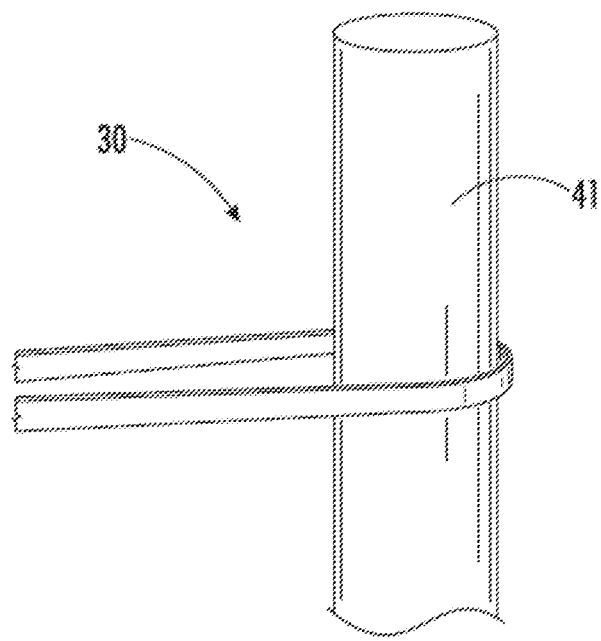
FIG. 2B is a partial perspective view of an exemplary pin wrap according to an embodiment of the invention.

Referring to FIG. 2, a pin wrap 30 is shown in perspective view. In an embodiment, pin wrap 30 is generally a U-shaped flexible member that is made from an orthotropic composite material such as fiberglass or graphite; but, in other embodiments, pin wrap 30 may be made from a metal or metal alloy. Pin wrap 30 is generally oriented along a vertical plane and extends for a finite length L from an inboard end 32 to an outboard end 34. Pin wrap 30 includes substantially identical first elongated arm 38 and second elongated arm 42 connected by a curved end 39 at the outboard end 34. First arm 38 has a first end 36 at inboard end 32 and traverses for a finite length L where it gradually tapers to a smaller height at outboard end 34. At outboard end 34, first arm 38 terminates into curved end 39 and continues as second arm 42 towards inboard end 32. Second arm 42 traverses a finite length L from curved end 39 where it gradually tapers to a larger height at second end 40. The height of pin wrap 30 varies according to the taper; however, the thickness of pin wrap 30 remains generally constant. First and second ends 36 and 40 include openings for bolts that attach to, in an embodiment, a rotor hub connecting member (not shown). While not required in all aspects, the curved end 39 could be encased in a clamp or fitting (not shown) for connecting to other elements of the rotor blade 20 or wrapped around a pin 41 as is depicted in FIG. 2B.

Figure 3:
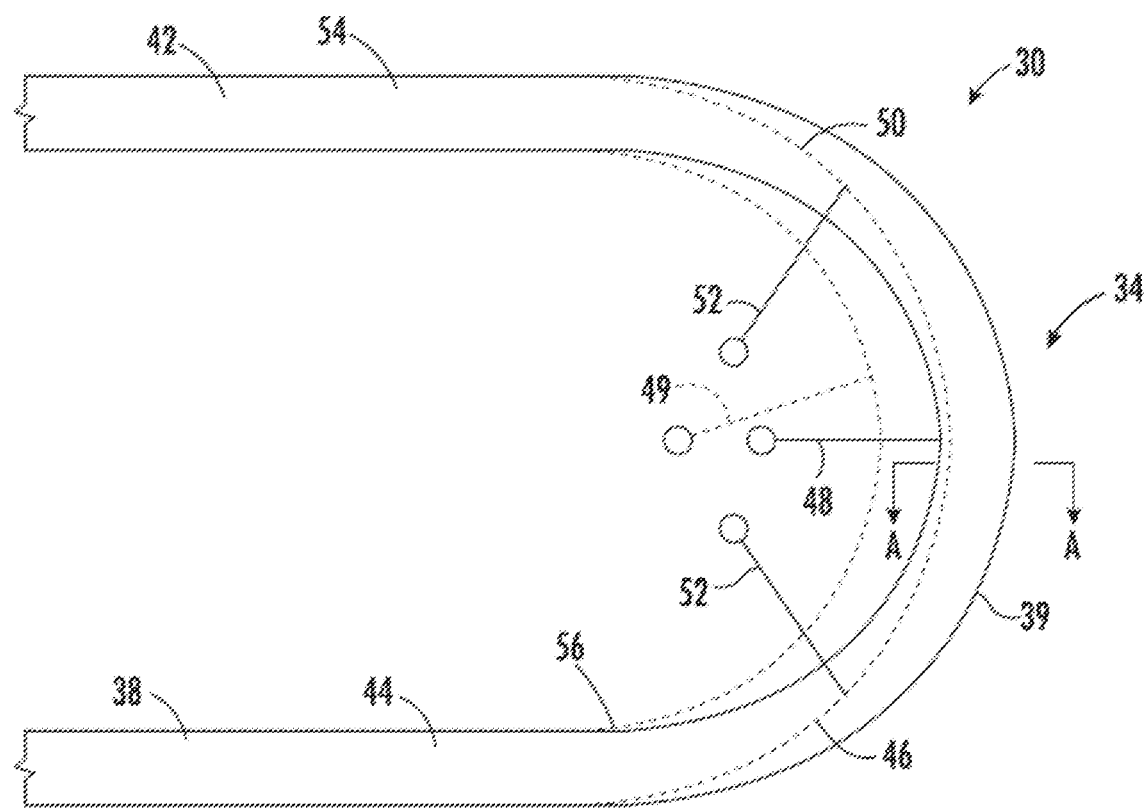
FIG. 3 is a partial plan view of the pin wrap of FIGS. 2A-2B showing a detail of an outboard end according to an embodiment of the invention.

FIG. 3 shows a partial plan view of a detail of outboard end 34 for pin wrap 30 according to an embodiment of the invention. In an embodiment, outboard end 34 incorporates multiple radii of curvatures around connecting pin 41 (FIG. 2B). First arm 38 has a generally linear portion 44 that terminates into curved end 39 at outboard end 34. Curved end 39 has generally arcuate or curved portions 46 and 50, each with a radius of curvature. In an embodiment, first curved portion 46 has a first radius of curvature 48 while second curved portion 50 has a second radius of curvature 52. In embodiments, first radius of curvature 48 can be dissimilar to second radius of curvature 52 or same as second radius of curvature 52. Further, curved end 39 terminates into a generally linear portion 54 of second arm 42 as it loops around connecting pin 41. While a double radius of curvature is discussed in an embodiment in FIG. 3, additional radii of curvature at curved end 39, e.g., three, four or other multiple radii, could also be contemplated so as to provide other optimal shapes of pin wrap 30 in other applications.

Conventional pin wraps are typically made with a uniform geometry at a curved portion with a single radius of curvature 49 (shown in phantom in FIG. 3) around a circular clamp or fitting. With these conventional pin wraps, stress concentration is at an edge of tangency where the curved portion wraps around a clamp or fitting when tension is applied. This non-uniform stress concentration results in a pin wrap that is oversized in other areas of the curved portion for a given stress value. In the present pin wrap 30, stress concentration along edge of tangency 56 is minimized as the multiple radii of curvatures such as, for example, a double radius of curvature 48 and 52 can contact more surface area of connecting clamp or fitting (not shown). Stress in pin wrap 30 is distributed along the entire perimeter of the inside surface of curved portions 46 and 50, which creates a uniform pressure at curved end 39. As the stress is distributed, the overall structure of pin wrap 30 can also be made smaller than what would be required for a conventional pin wrap with a circular outboard end having a single radius of curvature or a bolted connection. A technical effect is a structurally efficient pin wrap 30 that optimizes the geometry of pin wrap 30.

Figure 4:
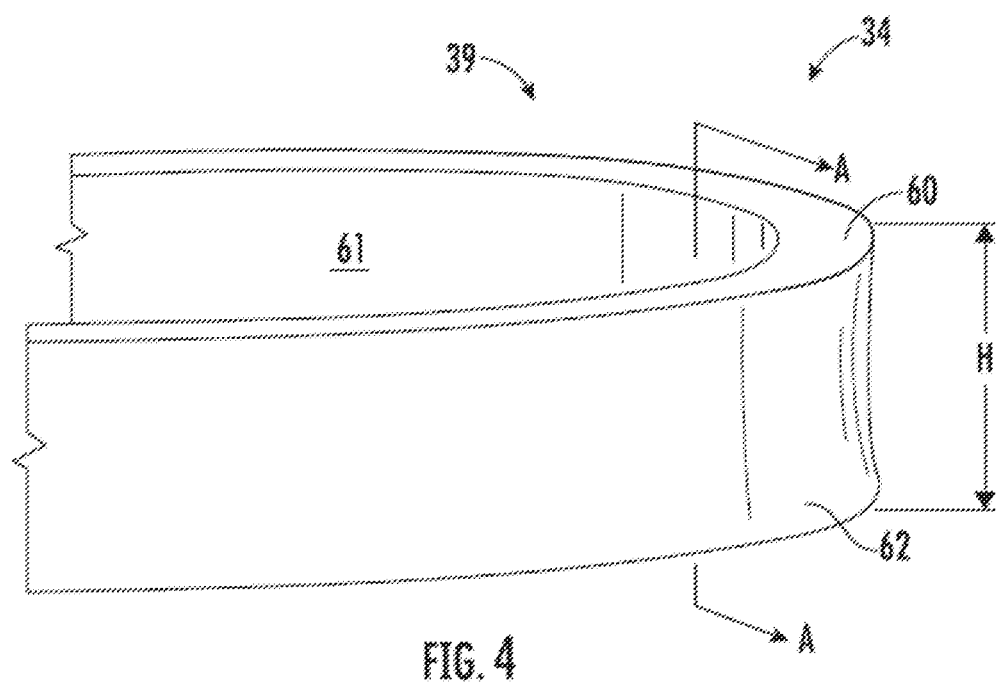
FIG. 4 is a partial side perspective view of the pin wrap of FIGS. 2A-2B but showing a detail of the outboard end according to an embodiment of the invention.
Figure 5:
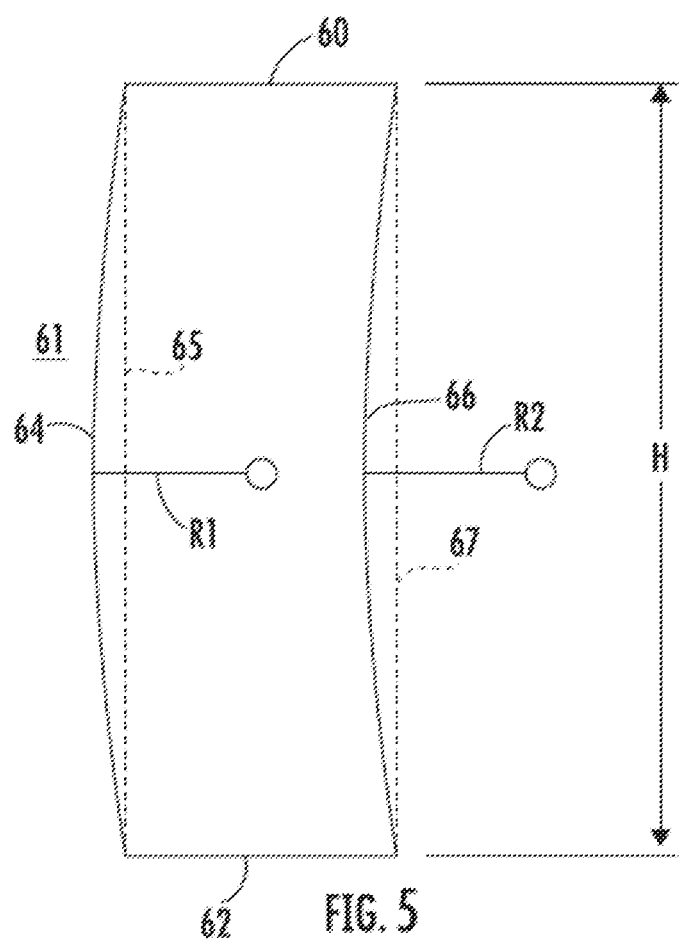
FIG. 5 is a schematic cross-section view of the pin wrap of FIG. 4 according to an embodiment of the invention.

FIG. 4 shows curved end 39 in a partial elevation view and FIG. 5 shows a cross-section view of curved end 39. In an embodiment, curved end 39 includes a first radius of curvature R1 for interior surface 64 (See FIG. 5) along a height H of curved end 39 extending into interior cavity 61 and exterior surface 66 has a second radius of curvature R2 (see FIG. 5) along the height of curved end 39 extending into interior cavity 61. In embodiments, first radius of curvature R1 is substantially the same as second radius of curvature R2 or could be dissimilar. A cross-section view of a conventional pin wrap with a uniform geometry at a curved portion (shown as a phantom rectangle in FIG. 5) is also depicted and shows a generally orthogonal interior surface 65 and a generally orthogonal exterior surface 65. In the present invention, curved end 39 has a top edge 60 and bottom edge 62, which define a height H. Inner surface 64 of curved end 39 is convex along height H and outer surface 66 of curved end 39 is concave along height H.

With a conventional pin wrap made from an orthotropic composite material, as the outboard end wraps around a circular clamp or fitting and tension is applied to the circular clamp or fitting, the pin wrap curves radially outwards from an interior cavity of pin wrap. As a result, top and bottom corners are in contact with the surface of the connecting fitting (along top and bottom edges of the pin wrap). These top and bottom corners see a higher stress concentration than other areas of the curved end 39 causing higher loads or stress at these areas at an expense of other areas of the pin wrap 30. In the present invention, by pre-curving the pin wrap 30 radially towards interior cavity 61, loads or stress can be redistributed along entire height H of curved end 39 when tension is applied to connecting clamp or fitting (not shown) or connecting pin 41 (FIG. 2B).

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to propeller blades for aircraft, and can be used in other portions of an aircraft (such as a yoke), in wind turbines and other systems with rotary elements. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pin wrap having a unitary construction, comprising:
    a first elongated arm having a first inboard end and a second outboard end;
    a second elongated arm having a first inboard end and a second outboard end; and
    a curved end having an internal surface and a directly opposing external surface extending over a height of the curved end, wherein the internal surface is convex along the height of the curved end and the external surface in concave along the height of the curved end;
    wherein the curved end integrally connects the outboard end of the first elongated arm to the outboard end of the second elongated arm; and
    wherein the curved end is arcuate and includes a first section of the curved end having a first radius of curvature and a second portion of the curved end having a second radius of curvature.

2. The pin wrap of claim 1, wherein the first radius of curvature is associated with an interior surface of the first section and the second radius of curvature is associated with an interior surface of the second section.

3. The pin wrap of claim 2, wherein the first radius of curvature is dissimilar from the second radius of curvature.

4. The pin wrap of claim 1, wherein the convex shape is configured to redistribute stress uniformly along the height of the curved end.

5. The pin wrap of claim 1, wherein the external surface has a concave shape along a height of the curved end, the height being perpendicular relative to a plane defined by the first radius of curvature and the second radius of curvature.

6. The pin wrap of claim 1, wherein the curved end is configured to receive a connecting element along the internal surface.

7. The pin wrap of claim 1, wherein the first radius of curvature and the second radius of curvature of the curved end are configured to create a uniform pressure distribution along the internal surface.

8. The pin wrap of claim 1, wherein the first and second elongated arms are tapered from the inboard end to the outboard end.

9. The pin wrap of claim 1, wherein the pin wrap is made from an orthotropic composite material.

10. The pin wrap of claim 1, wherein the inboard end of each of the first arm and the second arm includes a plurality of bolt holes for attachment to a structure.

11. The pin wrap of claim 1, further comprising a rotor blade having a body that contains the pin wrap.

12. The pin wrap of claim 11, wherein the rotor blade is configured to be coupled to a rotor hub.

13. The pin wrap of claim 1, further comprising a helicopter that contains the pin wrap.

14. The pin wrap of claim 13, further comprising:
    a plurality of rotor blades coupled to a rotor hub; and
    wherein the pin wrap is contained within each of the rotor blades and being configured to connect each of the rotor blades to the rotor hub.

* * * * *